United States Patent Office 3,324,705
Patented June 13, 1967

3,324,705
AIR GAGE SETTING MASTERS
Clifford Stead, North Smithfield, and Roger Clement Milette, Cumberland, R.I., assignors to The Taft-Peirce Manufacturing Company, Woonsocket, R.I., a corporation of Rhode Island
Filed Apr. 6, 1965, Ser. No. 445,892
12 Claims. (Cl. 73—1)

The present invention relates to workpiece simulating master devices for use in adjusting and checking the tolerance limits of computing or standard indicator means of the dial or air column type gage apparatus or fixtures each equipped with a gaging air nozzle plug located a fixed distance from a fixed reference point for checking the relationship of the axis of a hole in any of a series of production workpieces to a fixed reference point and a fixed reference surface of the workpiece.

Such a type of air gage fixture is in common use. For example, a form thereof is advantageously useful in checking quickly the relationship between the axes of the crank arm bearing bore and the pin bearing bore in a series of production connecting rods, i.e., the relative locations and orientations of these bores.

For this purpose such an air gage fixture may be equipped with a pair of gaging air nozzle plugs fixedly mounted a precise distance apart and intended respectively to be received in the crank arm bearing and pin bearing bores of each production connecting rod when the latter is placed thereon for the checking operation. As is well understood in this art, each plug is provided with a plurality of air nozzles or orifices which are connected in parallel by suitable air conduits to a dial-equipped or column-type computing indicator or a pair of standard indicators of the dial or air column type for checking the permissible maximum and minimum tolerances of the distance between the axes of the connecting rod bearing bores. Conventionally, each plug is also provided with an additional plurality of air nozzles or orifices which are connected in parallel by other suitable air conduits to standard computing indicator means for checking the permissible maximum and minimum tolerances of longitudinal bend of each connecting rod, and also to check the right and left tolerance limits of transverse twist of the crank arm and pin bearings of each connecting rod.

In preparing such air gage apparatus for production service, or periodically to check the settings of the dials or air columns of the indicators thereof, it is a practice to provide a group of carefully machined unadjustable master devices. Each is a single block or piece consisting of a longitudinal arm having a pair of spaced apart holes (which may be lined) and simulating the connecting rod to be mass produced. One pair of such masters has the axes of these holes arranged precisely parallel and normal to reference side faces with these axes of one located longitudinally apart the maximum production tolerance distance and with these axes of the other located longitudinally apart the minimum production tolerance distance. The dial face of the indicator for checking the center distances of the production workpieces is equipped with a pair of adjustable tolerance limit pointers located to opposite sides of the zero dial setting, and the swing of dial pointer is to remain within the dial sector between these tolerance limit pointers for dictating acceptability of successive production workpieces. The tolerance limit pointer to the left of the zero setting may indicate the maximum center distance tolerance limit and that to the right thereof the minimum center distance tolerance limit.

Such group of unadjustable master devices commonly require additionally at least two thereof for dictating the setting of a pair of adjustable tolerance limit pointers located to opposite sides of the zero dial setting of the second indicator for dictating the limits of the dial sector within which the swing of the dial pointer must remain for acceptability of tested producton workpieces bent longitudinally to cause the axes of the holes to be angularly related in a longitudinal direction. The left tolerance limit pointer of this second indicator may dictate the tolerable maximum amount of longitudinal non-parallelism of these axes to one side caused by positive medial bowing of the intervening workpiece body, and the right tolerance limit pointer may dictate the tolerable maximum of longitudinal non-parallelism of these axes to the other side caused by negative medial bowing of the intervening workpiece body.

This group of unadjustable master devices preferably will also include an additional pair for dictating the limits of the dial sector in which the swing of the dial pointer of a third indicator must remain for acceptability of tested production workpieces twisted about a longitudinal axis extending between the axes of the bearing bores which cause these axes to be angularly related in a transverse direction. The left tolerance limit may dictate the tolerable maximum amount of transverse counterclockwise twist of one bearing bore relative to the other and the right tolerance limit may dictate the tolerable maximum amount of transverse clockwise twist thereof relative to the other.

The careful machining of such a plurality of separate masters entails a relatively great expense and it is an object of the present invention appreciably to reduce this cost by providing a single master device having one or more adjustable gaging heads which will replace efficiently the group of expensive unadjustable masters.

Another object of the invention is to provide such a single master device which when once properly mounted by simple placement upon the air gage fixture with insertion of a gaging plug thereof into an adjustable bushing of the single master and with a reference point of the latter aligned with a reference point of the fixture the setting manipulations of computing indicator means associated with the fixture and of the air supply equipment of the latter, or manipulations to check the settings thereof, effectively does not require any replacement of one master by another during the procedure. Simple manipulation of the one or more bushings of the mounted single master device of the present invention permits its efficient conversion from one type of master to another for making the next required adjustment or check.

Still another object of the invention is to provide such air gage setting masters which permit one at any time to check out the zero settings of the gages in a simple and efficient manner.

A further object of the invention is to provide structural embodiments of the new and unique adjustable master device which are readily constructed and permit efficient use and operation thereof.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
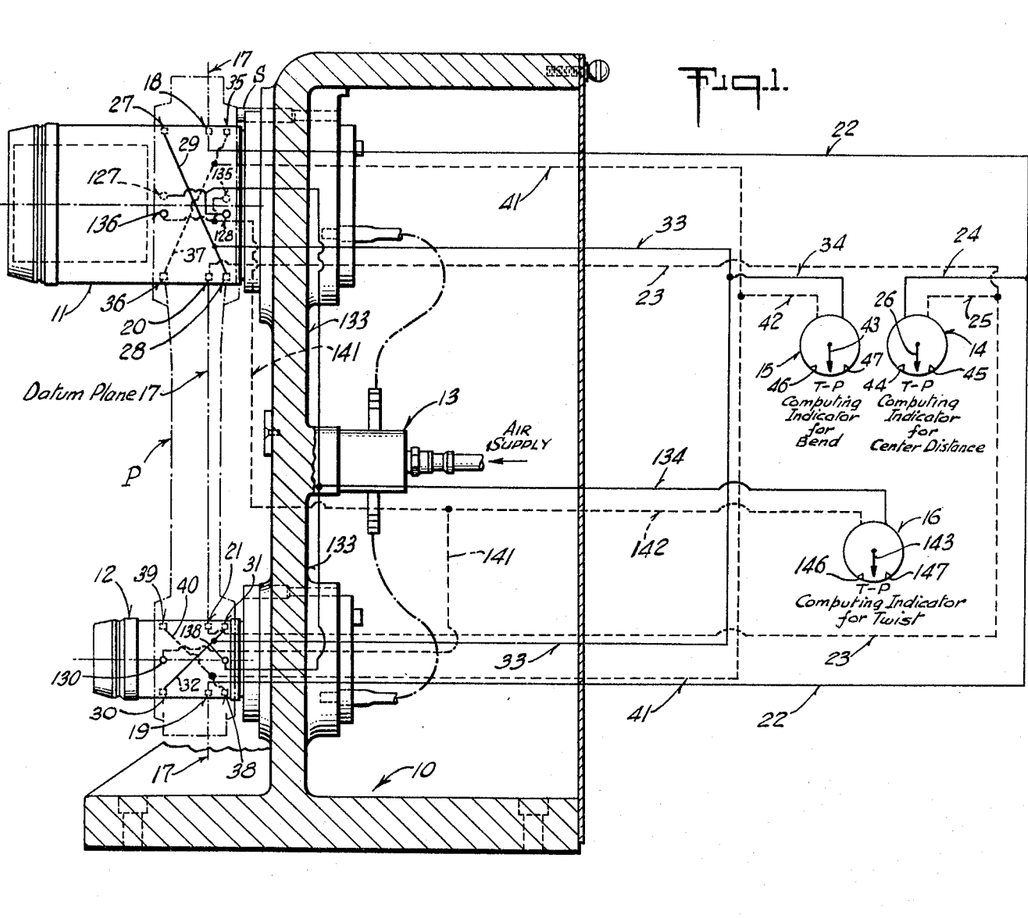
FIG. 1 is a schematic layout, with parts broken away and others in section, of air gage apparatus of conventional type including an air gage fixture equipped with a pair of conventional gaging air nozzle plugs with orifices thereof connected in separate conduit circuits to a plurality of computing indicators, such apparatus being of a type to employ to advantage embodiments of the air gage setting master of the present invention.

Referring to the drawings, in which like numerals identify similar parts throughout, and more particularly to FIG. 1, it will be seen therefrom that an air gage apparatus designed to check the relationship of the axes of bearing bores of production connecting rods, and the like, may include an air gage fixture 10 of conventional design equipped with a pair of gaging air nozzle plugs 11 and 12, suitable air supply means 13, three computing indicators 14, 15 and 16, and suitable conduit circuitry connecting nozzles or orifices of the plugs to the indicators. The air gage fixture 10 and its gaging plugs 11 and 12 are of a nature as to permit ready successive checking of production pieces or connecting rods, one of which is indicated in dot-dash lines at P in the checking position.

In a datum plane, indicated by dash-dot-dot lines at 17 in FIG. 1, the air plugs 11 and 12 are provided with outside nozzles or orifices 18 and 19 and inside nozzles or orifices 20 and 21. The datum plane 17 is established relative to the air plugs 11 and 12 of the air gage fixture 10, and also to the air gage setting master, as a reference plane at which the center distance between the axes of the spaced bearing bores is to be calibrated. To check the center distance of two holes in any surface or body, such as the bearing bores in a production piece or connecting rod P, the gaging plugs 11 and 12 are positioned in these holes or bores to abutment of a stop pin S by a portion of the piece. The outside nozzles 18 and 19 are connected in parallel in one conduit circuit, indicated in solid lines at 22, and the inside nozzles 20 and 21 are connected in parallel in another conduit circuit, indicated at 23 by dotted lines. The outside nozzle circuit 22 is connected by conduit 24 and the inside nozzle circuit 23 is connected by conduit 25 to the computing indicator 14, serving as the checking instrument for the center distance. The computing air indicator 14 is of the single dial pointer type, having its single pointer illustrated at 26, and the nozzle circuit 18, 19, 22 and 24 gages the distance between the outer edges of the circumference of the two holes on the datum plane 17. The inside nozzle circuit 20, 21, 23 and 25 gages the distance between the inner edges of the circumferences of the two holes on the datum plane 17. These two measurements are balanced internally in the computing air indicator 14 and the reading of the dial pointer 26 on the single dial is the amount by which the distance between the axes or centers of the two holes varies from predetermined specifications, regardless of variations in sizes of the holes.

Gaging plug 11 also is provided with a pair of axially staggered inwardly, outside nozzle 27 and inside nozzle 28 which are cross-connected by a conduit 29. Likewise, gaging plug 12 is provided with a pair of axially staggered inwardly, outside nozzle 30 and inside nozzle 31 which are cross-connected by a conduit 32. One conduit circuit 33 connects the cross-connecting conduits 29 and 32 together and this circuit is conneted by a conduit 34 to computing air indicator 15. Gaging plug 11 is also provided with a pair of outside nozzle 35 and inside nozzle 36, which are axially stagged outwardly, and cross-connected by a conduit 37. Similarly, gaging plug 12 is provided with a pair of outside nozzle 38 and inside nozzle 39, which are axially staggered outwardly, and cross-connected by a conduit 40. Another conduit circuit 41 is connected to the cross-connecting conduits 37 and 40, in turn, is connected by conduit 42 to the computing air indicator 15 which is also equipped with a dial having a single pointer 43. The computing air indicator 15 is employed for the purpose of giving a single pointer reading on its dial for bend since the two measurements taken by its pair of conduit circuits are internally balanced.

Figure 1A:
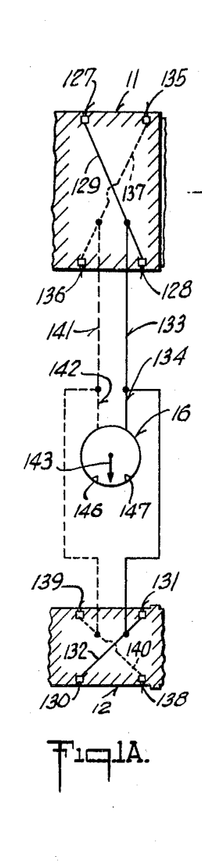
FIG. 1A is a schematic layout of conduit circuitry showing sets of nozzle orifices connected to a third computing indicator for checking a third condition of "twist" which is not entirely clear from the showing in FIG. 1, portions of the two air plugs being indicated in diametrical sections with parts broken away, that for the upper plug being arranged a few degrees from normal disposition to the longitudinal axial plane and that for the lower air plug being arranged substantially normal to or 90° from the longitudinal plane.

As will be seen from FIG. 1 and particularly FIG. 1A gaging plus 11 further is provided with a pair of axially staggered inwardly, outside nozzle 127 and inside nozzle 128 in a transverse diametrical plane which is a few degrees from being normal to the longitudinal diametrical plane of this plug, i.e., a few degrees from being perpendicular to the face of FIG. 1, and these staggered nozzles are cross-connected by a conduit 129. The few degrees variance of this transverse diametrical plane from normal disposition with respect to the longitudinal diametrical plane is not for the purpose of attaining a desirable different function but solely to avoid interference with other structural features of plug 11, and since in such positions of slight variance they will give results substantially the same as if these nozzles were located in a transverse diametrical plane exactly normal to the perpendicular diametrical plane. Likewise, gaging plug 12 is provided with a pair of axially staggered inwardly, outside nozzle 130 and inside nozzle 131 in a transverse diametrical plane which is normal to the longitudinal diameterical plane thereof, i.e., perpendicular to the face of FIG. 1, and these axially staggered nozzles are cross-connected by a conduit 132. One conduit circuit 133 connects the cross-connecting conduits 129 and 132 together and this circuit is connected by a conduit 134 to computing air indicator 16. Gaging plug 11 is also provided with a pair of outside nozzle 135 and inside nozzle 136 in the plane of nozzles 127 and 128, which are axially staggered outwardly, and cross-connected by a conduit 137. Similarly, gaging plug 12 is provided with a pair of outside nozzle 138 and inside nozzle 139 in the plane of nozzles 130 and 131, which are axially staggered outwardly, and cross-connected by a conduit 140. Another conduit circuit 141 is connected to the cross-connecting conduits 137 and 140 and, in turn, is connected by conduit 142 to the computing air indicator 16 which is also equipped with a dial having a single pointer 143. The computing air indicator 16 is employed for the purpose of giving a single pointer reading on its dial for twist since the two measurements taken by its pair of conduit circuits are internally balanced.

Since the air gage apparatus of FIGS. 1 and 1A and the mechanism thereof, including its fixture, the three computing indicators and the conduit circuitry, as well as the functioning of the parts, are already known in the art no further detailed description or explanation are deemed necessary to an understanding of the air gage setting master of the present invention. However, it should be pointed out that the single pointer dial of each of the three computing indicators is equipped with manually adjustable left and right tolerance markers located to opposite sides of the zero setting to define therebetween the sector of the dial in which the dial pointer is to swing for indicating acceptability of any production workpiece subjected to test by this apparatus. For example, the computing indicator 14 for checking center distance is equipped with left and right adjustable tolerance markers 44 and 45, the computing indicator 15 is equipped with left and right adjustable tolerance markers 46 and 47, and the computing indicator 16 is equipped with like left and right adjustable tolerance markers 146 and 147, as will be seen from FIG. 1 and 1A. The respective dial pointers of indicators 14, 15 and 16, i.e., 26, 43 and 143, are shown in their zero setting positions.

Figures 2, 3:
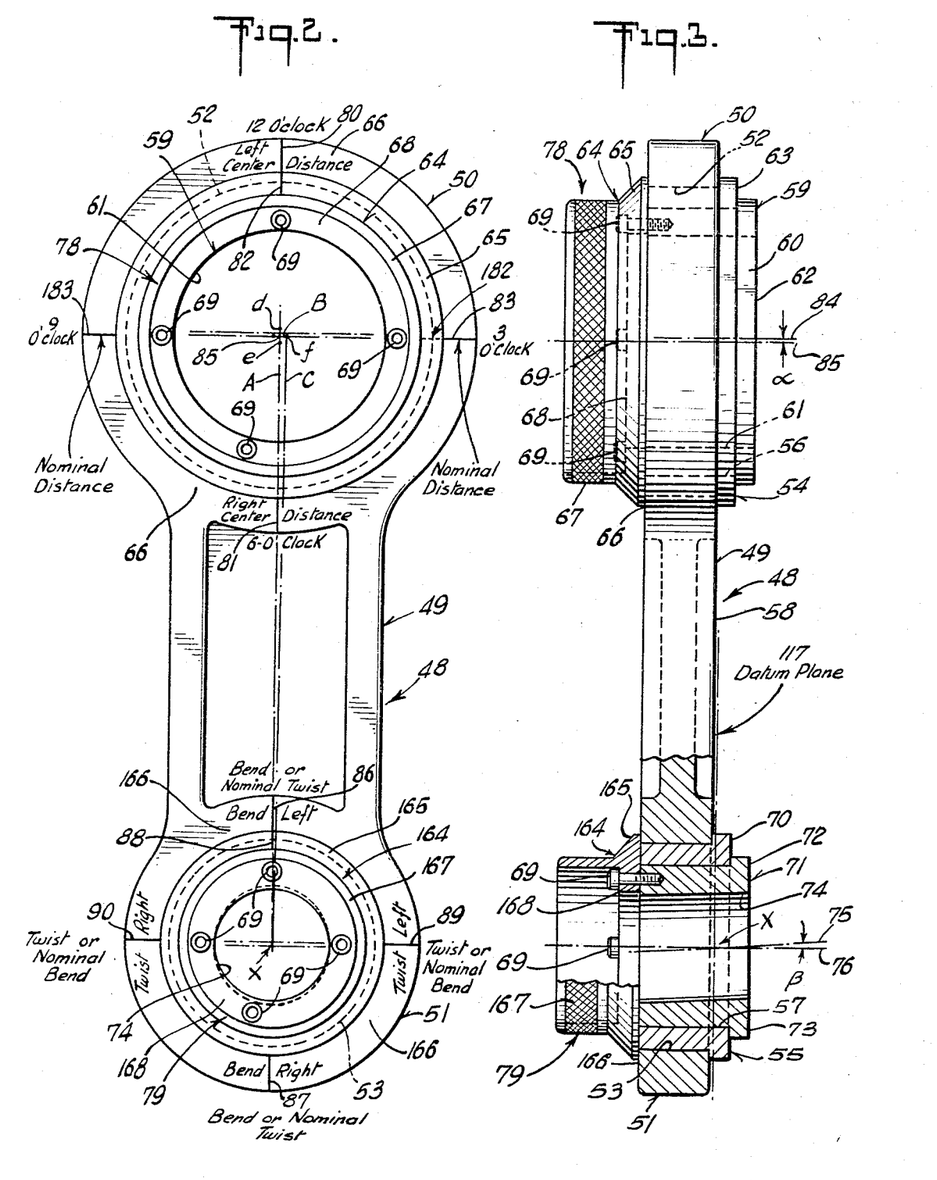
FIG. 2 is a plan view of an embodiment of the air gage setting master of the present invention which may simulate a production workpiece in the form of a connecting rod, or the like, featuring a pair of spaced bearing bores of which the relationship of their axes is to be checked by this air gage apparatus.
FIG. 3 is a side elevational view, with parts broken away and in section, of the air gage setting master shown in FIG. 2.

An embodiment of the air gage setting master of the present invention is illustrated in FIGS. 2 and 3 and it is useful initially to adjust the air gage apparatus of FIG. 1, or for time-to-time checking of the adjustments thereof, to permit efficient use of the latter for successively gaging production workpieces featuring a pair of spaced apart holes in any surface or body, e.g., connecting rods, to determine if the center distances between their bearing bores, or the bores of their pin and crank arm bearings, are within specified tolerance limits, and to check if the relationship of the axes of these holes or bores resulting from longitudinal or transverse twist is within the acceptable predetermined tolerance limits. The air gage setting master 48 of FIGS. 2 and 3 is designed for simulating successively production connecting rods and thus it comprises an elongated rigid body 49 terminating at opposite ends in enlargements 50 and 51 which are elements of a pair of gaging head structures or assemblies. The end enlargement 50 is provided with a through cylindrical hole 52 and the end enlargement 51 is provided with a through cylindrical hole 53. Within the hole 52 is fitted a steel liner bushing 54, and a similar steel liner bushing 55 is fitted in the hole 53. The liner bushings 54 and 55 are respectively provided with concentric cylindrical bores 56 and 57, the axes of which are spaced apart a distance equal to the mean center distance dimension between the axes of the crank arm and pin bearing bores of the production connecting rods. These liner bushing bores 56 and 57 constitute a first cylindrical crank arm bushing-receiving hole and a second cylindrical pin bushing-receiving hole and their axes are arranged precisely normal to or square with a reference face, such as 58 of the body 49, so that they are parallel with each other.

Cylindrical square bore 56 of the liner bushing 54 has rotatably fitted therein a hardened steel sleeve 59 constituting a part of a gaging head bushing assembly. The sleeve 59 has a truly cylindrical outside surface fitted for rotation within the bore 56 of the liner bushing 54 and carries at one end an annular flange 60 which is abutted to the outer end surface of this liner bushing. Sleeve 59 is provided with a cylindrical through bore 61 simulating the crank arm bearing bore of a production connecting rod, and thus constitutes a cylindrical gaging hole. The gaging hole 61 is formed square with reference face 58 but located off center in bushing sleeve 59 by being eccentrically formed therein to have its axis parallel to and laterally offset from the axis of the external cylindrical surface of this bushing sleeve. The end surface 62 of the end flange 60 of bushing sleeve 59 is normal to or square with the axis of the outside cylindrical surface of this sleeve and also with respect to the axis of the cylindrical eccentric gaging hole 61. Thus the bushing end surface 62 is parallel to the reference face 58. Since the bore 56 of the liner bushing 54 constitutes the first cylindrical crank arm bushing-receiving hole in one end of the master body 49 its outer end surface 63 defines an annular zone of this body structure flanking the bushing-receiving hole 56 in which the bushing sleeve 59 is rotatably fitted, with the bushing annular flange 60 being abutted thereto. The axis of the cylindrical eccentric gaging hole provided by the bore 61 of the bushing sleeve 59 is offset from the axis of the liner bushing bore 56 by one half the center distance tolerance specified for the production workpiece, which is indicated by the distance ($\alpha$) in FIG. 3.

The gaging head bushing sleeve 59 is held for rotation in the liner bushing bore 56 by an annulus 64 which has an annular external lateral flange 65 rotatably abutted against another annular zone 66 of the master body 49 flanking the other end of the bushing-receiving hole 56. This annulus 64 includes a knurled cylindrical projecting flange which serves as a manually-engaging knob 67 for rotating the bushing sleeve 59. Since, in this respect, the gaging bushing assembly just described is similar to that at the other end of the master body 49 it will be more readily understood from the sectioning of the latter that the annulus 64 has an internal lateral flange 68 through which a plurality of cap screws 69 extend for threadable engagement in internally-threaded holes in the opposed inner end of the gaging bushing sleeve 59. Thus these screws 69 collectively constitute adjustable fastening means which connect the annulus 64 to the sleeve 59, permitting the sleeve flange 60 and the annulus flange 65 to be adjusted axially relative to each other for varying the frictional drag thereof respectively against the annular zones 63 and 66, so that this assembly may be angularly adjusted between a plurality of positions while being adapted temporarily to be held in any selected one of the positions of angular adjustment.

The bore 57 of liner bushing 55 also has an outer flanged end with the end surface 70 thereof providing an annular zone of the master body 49 flanking the second cylindrical pin bushing-receiving hole provided by its bore 57. This second body hole 57 has rotatably fitted therein a pin bushing 71 which simulates the pin bearing of each production connecting rod and its outer end is equipped with an annular flange 72 which is abutted to the annular zone 70. The end surface 73 of the gaging bushing annular flange 72 is arranged parallel to or square with the reference face 58 of the master body 49. The bore 74 of the bushing sleeve 71 simulates the pin bearing bore of a production connecting rod and it extends through this sleeve obliquely or off center with its axis, indicated at 75 in FIG. 3, arranged at an acute small angle ($\beta$) to the axis, indicated at 76, of the cylindrical outer surface of bushing sleeve 71. These axes 75 and 76 intersect, i.e., the apex of the angle ($\beta$), is located precisely at a true center point X established by a datum plane 117. The datum plane 117 of the air gage setting master 48 coincides with the datum plane 17 of the air gage fixture 10 of FIG. 1 when this air gage setting master is mounted thereon with the gaging plug 11 received through the bore 61 and the gaging plug 12 is received through the bore 74. The datum plane 117 is parallel to the reference face 58 of the master body 49.

A second annulus 164 is provided to maintain the rotary bushing sleeve 71 within the liner bushing bore 57, and it also includes an annular external lateral flange 165 rotatably abutted against another annular zone 166 of the master body 49 flanking the opposite end of the bushing-receiving hole constituted by liner bushing bore 57. The annulus 164 also includes a cylindrical projecting flange 167 which likewise serves as a manually-engaging knob for rotating the gaging bushing sleeve 71. The annulus 164 also is equipped with an internal lateral flange 168 which is fastened by adjustable fastening means to the inner end of the sleeve 71, and such adjustable fastening means is likewise in the form of a plurality of the cap screws 69 for permitting the sleeve annular flange 71 and the annulus flange 165 to be adjusted axially relative to each other for varying frictional drag thereof respectively against the annular zones 73 and 166 for temporarily holding this assembly in any selected one of a plurality of positions of angular adjustment within the liner bushing bore 57.

The gaging bushing assembly, comprising sleeve 59 and annulus 64, constitutes a critical part of a first gaging head structure or assembly 78 employed for the purpose of checking center distance tolerance settings of computing indicator 14. The gaging bushing assembly, comprising gaging sleeve 71 and annulus 164, constitutes a critical part of a second gaging head structure or assembly 79 employed for the purpose of checking both bend and twist tolerance settings of computing indicators 15 and 16. In order to accomplish bend tolerance regulation by computing indicator 15 and twist tolerance regulation by computing indicator 16 the axis 75 of the bore 74 in gaging bushing 71 is arranged at the angle ($\beta$) to the normal axis 76 to provide a degree of out-of-square to the latter axis of the master body hole 57 by the total of the required tolerances specified for these respective conditions of the production workpiece. It is important that the center distance regulation be not affected by the rotary position of the out-of-square gaging bushing 71 since, otherwise, the center distance setting would be compounded. This is avoided by locating the apex of the angle ($\beta$) between the axes 75 and 76 precisely at the true center point X established by the datum plane 117. Accordingly, the center distance regulation, established along the coinciding datum plane 17, does not change when the small diameter bushing 74 is rotated. Eccentric and out-of-quare conditions of the master gage bushings 59 and 71 are interpreted by respective markings on the gaging heads 78 and 79 and the master body 49 to indicate proper settings for the bend, twist and center distance tolerances.

For the latter purpose annular zone 66 of the master body enlargement 50 is provided with a diametrically opposite pair of index marks aligned with the longitudinal axis of the air gage setting master 48 which extends between the centers of the bushing-receiving holes 56 and 57, and thus constitutes the longitudinal body reference line thereof. Circumferential flanking zone 66 may be provided directly on the face of the enlargement 50 or be provided as the outer face of a flat surrounding ring carried by this enlargement. This circumferential flanking zone 66 is provided with one of these index marks 80 as a radial line at 12 o'clock, to be employed in setting the left tolerance pointer 44 of computing indicator 14 for the center distance checking. The other of these index marks may be provided as a radial line 81 at 6 o'clock to be employed in setting the right tolerance pointer 45 of computing indicator 14 for the center distance checking. Gaging bushing head assembly 78 may be provided with a cooperative pointer mark in the form of a radial line 82 carried by the annulus flange 65, for alternate alignment with the index marks 80 and 81 upon 180° rotation of this gaging head. The indication of nominal center distance may be obtained by providing the annular zone 66 at 3 o'clock or at 9 o'clock, or both, with an additional radial index mark 83, or 183, with which, in 90° rotation of the gaging head 78 the pointer arrow 82 thereof may be aligned, such as is indicated by a dotted line at 182. There has been laid out on FIG. 2 to exaggerated scale by a right triangle A–B–C, a representation of what occurs in the rotation of the gaging head 78. For this purpose let it be assumed that the eccentricity or offset ($\alpha$) of axis 84 (FIG. 3) of bushing sleeve bore 61 from axis 85 of the master body hole 56 places this eccentric axis at the point ($d$) when the head pointer 82 is aligned with the index mark 80, and places it at the point ($e$) when this pointer mark is aligned with the index mark 81 by 180° rotation of this gaging head. A 90° rotation of the gaging head 78 will thus place the eccentric axis 84 at the point ($f$) with the alignment of the pointer mark now located at 182 with index mark 83. In actual practice the base B of the right triangle A–B–C is so small that the hypotenuse C is substantially equal to the abscissa A extending from point X normally to the axis 85. For all practical purposes the settings at 3 o'clock or 9 o'clock will provide nominal distance readings.

The circumferential flanking zone 166 of the master end enlargement 51, or the face of a flat ring supported thereby and surrounding annulus flange 165, is provided with a plurality of radial index marks located at quarter points. A diametrically opposite pair of these radial index marks 86 at 12 o'clock and 87 at 6 o'clock are provided in this zone in alignment with the longitudinal body reference line which coincides with the central axis A (X–85 of FIG. 2). The gaging bushing head assembly 79 is provided with a radial pointer arrow 88 for alternate alignment with the index marks 86 and 87 upon 180° rotation of this gaging head. Conditions of longitudinal bend of production workpieces or connecting rods are to be accommodated within predetermined acceptable tolerances by laying off a tolerance dial sector between manually settable pointers 46 and 47 of the computing indicator 15. When the pointer arrow 88 of gaging head 79 is aligned with index mark 86 the maximum deflection to the left of dial pointer 43 of computing indicator 15 will be incorporated in the latter. When the gaging head 79 is rotated 180° to align the pointer arrow 88 with the index mark 87 the maximum deflection of the dial pointer 43 of the computing indicator 15 will be incorporated in the indicator settings. These maximum limits of deflection of dial pointer 43 of computing indicator 15 for bend will be set up for visual reference by adjusting the manually settable pointers 46 and 47 to the deflection limits so attained. The mid-point in the dial sector so marked off represents the zero setting of pointer 43 with which it will be aligned when there is no bend in the piece P being checked, and any bend thereof which is acceptable will be reflected by the maintenance of the position of this pointer within the dial sector between the limits pointers 46 and 47.

The circumferential flanking zone 166 is also provided at 3 o'clock with radial index mark 89 and at 9 o'clock with another radial index mark 90. When the pointer arrow 88 is aligned with the index mark 89 by 90° rotation of the gaging head 79 the tolerance limit of twist to the left is set up for the third computing indicator 16, and when this pointer arrow is brought to alignment with the index mark 90 by a further 180° rotation of the gaging head 79, the tolerance limit of twist to the right is established. These maximum limits of deflection of the dial pointer 143 of computing indicator 16 for left and right twist will be set up for visual reference by adjusting the manually settable pointers 146 and 147 to the deflection limits so attained. The mid-point in the dial sector so marked off represents the zero setting of pointer 143 with which it will be aligned when there is no twist in the piece P being checked, and acceptability of any degree of left or right twist will be dictated by the maintenance of the position of this pointer within the dial sector between the limits pointers 146 and 147.

Figure 4:
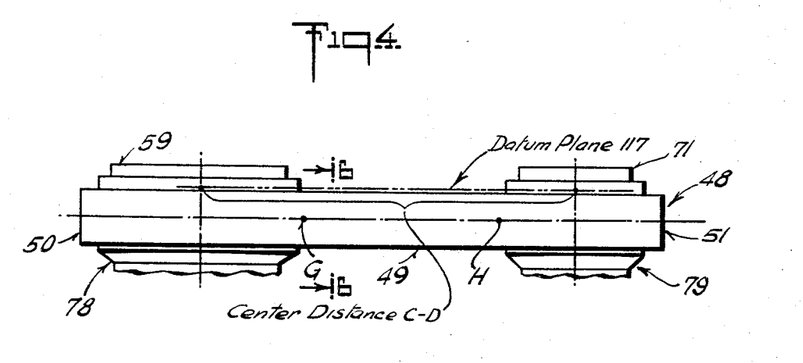
FIG. 4 is a side elevational schematic showing of a type of the air gage setting master of the present invention illustrated in FIGS. 2 and 3, with parts broken away, indicating the center distance between the axes of a pair of spaced apart bores which is to be checked.
Figure 5:
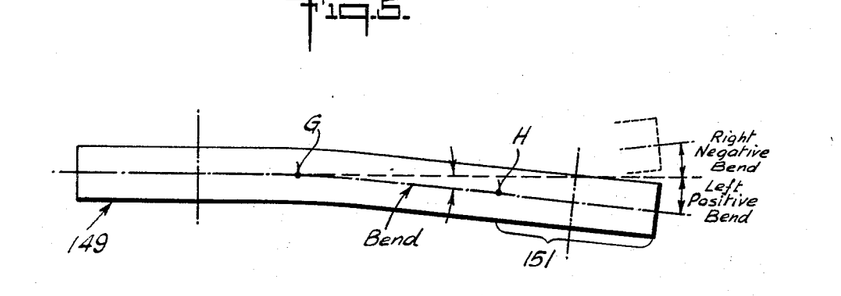
FIG. 5 is a side elevational schematic view illustrating conditions of bend which may be simulated by the air gage setting master illustrated in FIG. 4.
Figure 6:
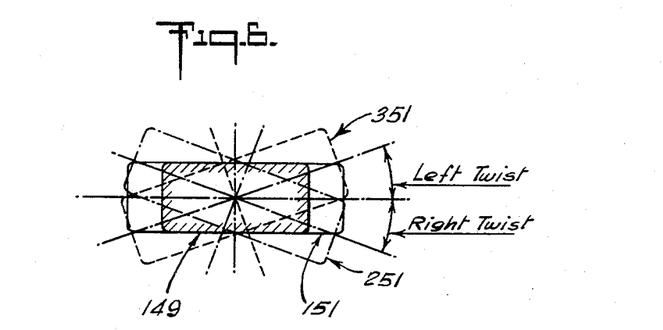
FIG. 6 is a transverse schematic sectional view taken substantially on line 6—6 of FIG. 4 illustrating conditions of twist.

FIG. 4 is a diagrammatic representation of the air gage setting master 48 to illustrate its simulation to a production workpiece to be checked by the air gage apparatus of FIG. 1 after it has been adjusted as dictated by applying to the fixture 10 this master and suitably manipulating the latter. It will be noted that the end enlargements 50 and 51 of the master body are intervened by a connecting section G–H. FIG. 5 is a representation at 149 of this body as simulating one of the production workpieces or connecting rods to demonstrate that bend occurs in the intervening connecting section G–H. The diagrammatic illustration in FIG. 6 demonstrates the conditions of twist of a production workpiece or connecting rod simulated by the air gage setting master 48 of FIG. 4. The full line section 149 in FIG. 6 shows by its outline and that of the enlargement 151 that there is no twist of the end enlargement 51 which simulates one bearing end of the production workpiece or connecting rod. The broken line outline 251 shows that there has been transverse twist clockwise of the end enlargement 151 and the broken line outline 351 shows that there has been transverse twist counterclockwise of this enlargement. These are to be respectively accommodated in the tolerance settings of the computing indicators 15 and 16 when the air gage apparatus of FIG. 1 is adjusted with the use of the air gage setting master 49 of FIGS. 2 and 3.

In order to employ the air gage setting master 48 of FIGS. 2 and 3 for adjusting the air gage apparatus of the type illustrated in FIG. 1 this master is applied to the fixture 10 by insertion of the gaging plug 11 in the gaging hole 61 and the gaging plug 12 in the gaging hole 74 fully until sleeve end surface 62 engages against stop pin S of the fixture for alignment or coincidence of the master datum plane 117 with the fixture datum plane 17. The knob of the pressure regulator (not shown) of the air gage apparatus is adjusted in the usual manner so that the gage pressure indicator pointers are in the mid positions or zero settings of the setting range. The tolerance markers of the indicators are set to the predetermined setting spans for dicating ranges of tolerances to be checked when the production workpieces are applied to the fixture. The computing indicator 14 for checking the center distance of production workpieces or connecting rods is then adjusted by manipulating the air gage setting master knob 167 of the gaging bushing assembly 79 to align its pointer arrow 88 with either the right or left index marks 89 or 90. The knob 67 of the gaging bushing assembly 78 is then rotated until the pointer arrow 82 thereof is aligned with the outer index mark 80 at 12 o'clock, and the zero setting knob is adjusted until the dial indicator pointer 26 coincides with the left tolerance marker 44. The gaging bushing assembly 78 is then rotated one half revolution by its knob 67 until the pointer arrow 82 of the latter is aligned with the inner index mark 81, which should cause the dial indicator pointer 26 to be aligned with the right tolerance marker 45. Should this latter reading not coincide the mganification should be either reduced or increased by lowering or increasing the gage pressure since if the total setting span or dial sector between the left and right markers is short the magnification must be increased and if it is long the magnification must be decreased. Manipulation of the knob of the pressure regulator (not shown) is employed for this purpose.

In order to set up the air gage apparatus for checking the degree of bend within the established tolerance range the knob 67 of the gaging bushing assembly 78 is rotated to bring the pointer arrow 82 thereof into alignment with either the index mark 83 or the index mark 183. The knob 167 of the gaging bushing assembly 79 is then manipulated to bring its pointer mark 88 into aligment with the inner index mark 86 and the zero setting knob of the dial or computing indicator 15 is adjusted until pointer 43 thereof coincides with the left tolerance marker 46. Then the gaging bushing assembly 79 is rotated through 180° to align its pointer arrow 88 with the outer index mark 87, which should cause the indicator pointer to coincide with the right tolerance marker 47. If such coincidence is not brought about the magnification should be adjusted for this computing indicator 15.

In order to adjust the tolerance range of the dial of computing indicator 16 to dictate the acceptable tolerance of twist the gaging bushing assembly 78 is kept in its position of alignment of its pointer arrow 82 with either the left or right index marks 83 and 183 and the knob 167 of the gaging bushing assembly 79 is manipulated to align its pointer arrow 88 with the left index line 89. The zero setting knob of the dial of indicator 16 is adjusted, if required, to bring the sweep of the indicator pointer 143 intermediately within the dial sector marked off between the tolerance markers 146 and 147, and the magnification adjusted, if necessary, as in the case of setting the computing indicator 15.

It is to be understood that embodiments of the air gage setting master of the present invention are not limited to types substantially of the form of that illustrated in FIGS. 2 and 3. For example, one such master may be provided for checking only the center distance of connecting rods on a single computing indicator of air gage apparatus by substituting for the gaging head 79 and the liner bushing 55 another steel liner bushing fixed within the master body hole 53 which has a bore of a diameter of the pin bore 74. The axis of such pin bore in such fixed liner bushing would define at the point X where it crosses the datum plane 117 a reference point located the nominal center distance C–D to the axis of the bore 56 in liner bushing 54 which rotatably supports the gaging head 78. Such a form of the air gage setting master of the present invention is illustrated at 248 in FIGS. 7 and 8 with the end of the master body 249 diagrammatically indicated in dotted lines at 251 being broken away and of the described form.

Figure 7:
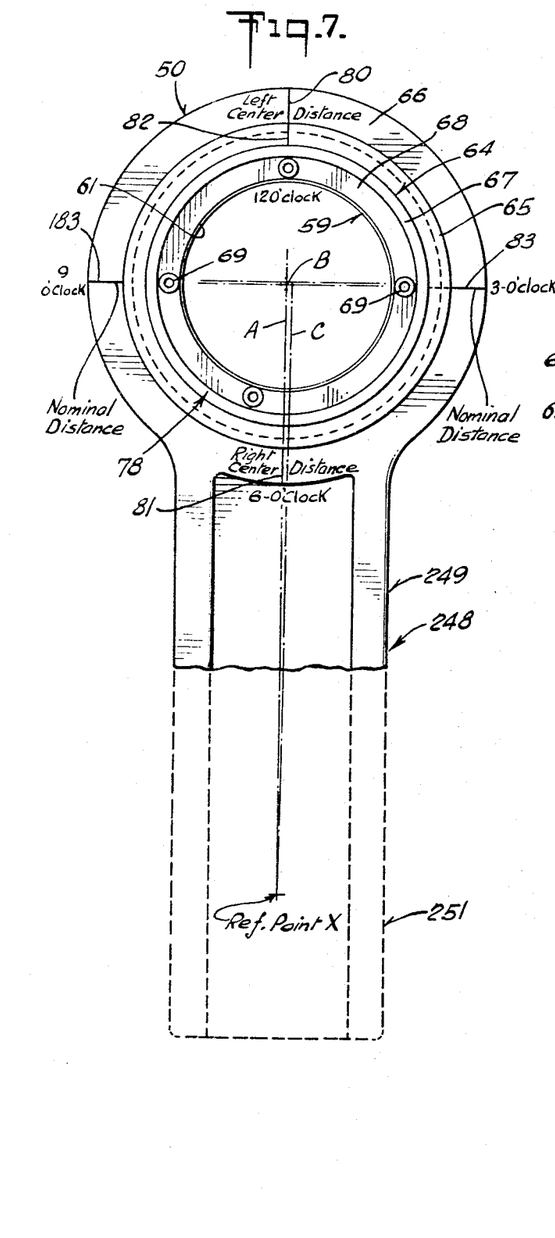
FIG. 7 is a plan view similar to FIG. 2, with one end of the air gage setting master broken away to illustrate an embodiment of the invention which is equipped with a single gaging bushing.
Figure 8:
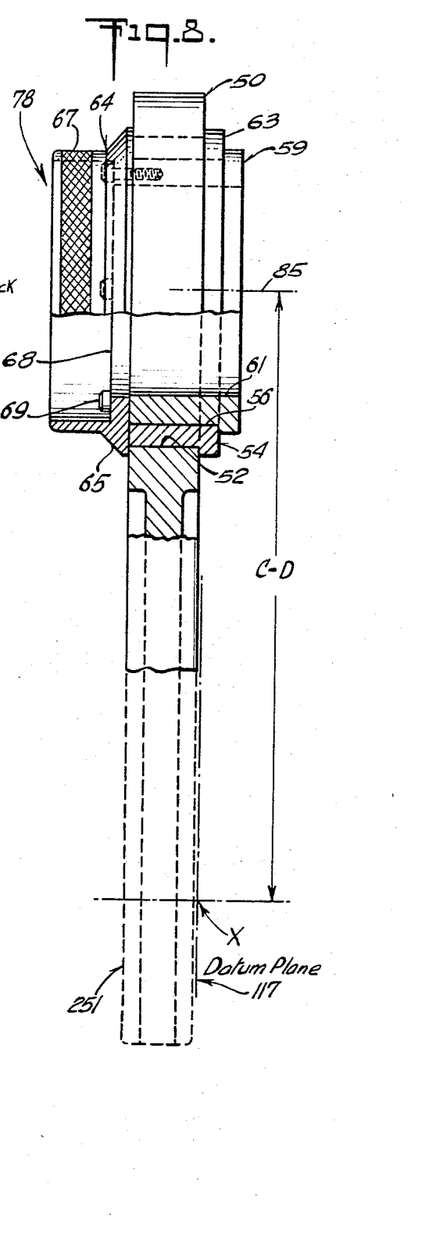
FIG. 8 is a side elevational view, with parts broken away and in section, of the structural embodiment depicted in FIG. 7.

Such a simplified form of the air gage setting master of the present invention for checking only center distances of production connecting rods may also be a variation of that proposed in FIGS. 7 and 8. Such variation might omit the gaging bushing assembly 78 and substitute for its supporting liner bushing 54 another bushing fixed in master body hole 52 and having a bore of the size of bushing bore 61 with its axis coinciding with axis 85 of the body hole 52. In this case gaging bushing assembly 79 would have substituted for its gaging bushing 71 an eccentric bushing of the type illustrated at 59. In this modified form the inner index mark 86, aligned with the longitudinal axis of the master body, would represent the left center distance and the outer index mark 87, also aligned with this longitudinal axis, would represent the right center distance. This air gage setting master also would be employed to adjust the air gage apparatus of FIG. 1 equipped with the single computing indicator 14.

Another modified form of the air gage setting master might substitute such a fixed liner bushing for the liner bushing 54 and gaging bushing assembly 78 to receive the gaging plug 11, with the liner bushing 55 in the master body hole 53 rotatably supporting the out-of-square gaging bushing 71 of gage head 79. This type of air gage setting master might be employed to check the squareness of the pin bearing bore of production connecting rods with respect to a reference surface constituted by the flanged outer end of the fixed liner bushing substituted for liner bushing 54 in the master body hole 52. In this case the inner index mark 86 associated with the gaging bushing assembly 79 would determine a left tolerance limit (#1) of bend and the index mark 87 would determine the right tolerance limit (#1) of bend, index mark 89 would determine a left tolerance limit (#2) of twist and the index mark 90 would determine the right tolerance limit (#2) of twist, of suitable computing indicator means of air gage apparatus of the general type illustrated in FIGS. 1 and 1A.

As a result of the foregoing description other variations of the air gage setting master of the present invention will readily occur to one skilled in the art. All such air gage setting masters of the present invention are designed for various uses in adjusting and checking the tolerance setting limits of computing indicator dial means of air gage apparatus having a gaging plug equipped with suitable air nozzles and located a fixed distance from a fixed reference point. These forms of the air gage setting master of the present invention comprise a rigid master body carrying at one location means defining a fixed reference point to be aligned with the fixed reference point of the air gage apparatus. This rigid master body is provided at a fixed distance from the reference point carried thereby with a cylindrical bushing-receiving hole and a flat reference face arranged parallel to a reference line extending from the master body reference point to the hole, and with the axis of the latter arranged perpendicular to this reference face. Each of these forms of air gage setting masters will be equipped with a cylindrical gaging bushing rotatably fitted into the hole and having means to rotate it therein between a plurality of positions of angular adjustment, and with the bushing being adapted temporarily to be held in any selected one of the positions of angular adjustment. The cylindrical bushing has means which defines a cylindrical off-center gaging hole extending therethrough for receiving the gaging plug therein.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. An air gage setting master for use in adjusting and checking the tolerance setting limits of computing indicator means of air gage apparatus having a gaging air nozzle plug located a fixed distance from a fixed reference point comprising, in combination,
    (a) a rigid master body carrying at one location fixed reference point defining means to be aligned with the fixed reference point of the air gage apparatus, and provided
    (b) at a fixed distance from said reference point defining means with a cylindrical bushing-receiving hole and
    (c) a flat reference face arranged parallel to a reference line extending from the master body reference point to the hole with the axis of the latter arranged perpendicular to said reference face,
    (d) a cylindrical bushing rotatably fitted into the hole and having means to rotate it therein between a plurality of positions of angular adjustment with said bushing being adapted temporarily to be held in any selected one of the positions of angular adjustment, and
    (e) means defining a cylindrical off-center gaging hole extending through said bushing for receiving the gaging plug therein.

2. The air gage setting master of claim 1 in which said bushing is provided with a pair of axially-spaced enlargements on opposite ends rotatably abutted against circumferential zones flanking the entrance and exit ends of the bushing-receiving hole with one of said enlargements carrying manual knob means for rotating said bushing in this hole.

3. The air gage setting master of claim 2 in which the bushing-receiving hole is defined by a through bore of a liner bushing.

4. The air gage setting master of claim 2 in which said enlargement that carries said manual knob means is in the form of an annulus having an annular external lateral flange rotatably abutted with frictional engagement against one of the circumferential zones and a cylindrical projecting flange serving as said knob means.

5. The air gage setting master of claim 4 in which fastening means are provided to connect said annulus to said bushing in a form permitting said enlargements to be adjusted axially relative to each other.

6. The air gage setting master of claim 1 in which the off-center gaging through hole in said bushing is eccentrically arranged with its axis parallel to and laterally offset from the axis of the external cylindrical surface of said bushing.

7. The air gauge setting master of claim 1 in which the off-center gaging hole in said bushing extends obliquely therethrough with its axis arranged at an acute small angle to the axis of the external cylindrical surface of said bushing.

8. The air gage setting master of claim 7 in which said master body is in the form of an elongated member having one end provided with the bushing-receiving cylindrical hole and with said bushing rotatably mounted therein as one of a pair of gaging head bushings,
    (f) one of said circumferential zones flanking one end of said hole carrying index marks at quarter points with a diametrically opposite pair thereof being aligned with the longitudinal body reference line and said gaging head bushing carrying a pointer mark radially aligned with a radial plane in which said angularly related axes are disposed with said pointer mark being alternately alignable with said pair of index marks in rotation of said gaging head bushing to dictate the maximum tolerance limits of at least one of the conditions, longitudinal bend in opposite directions and nominal twist, of a production work piece simulated by said master,
    (g) the remaining diametrically opposite pair of index marks being aligned along a transverse radial line at right angles to said reference line with which said pointer mark is alternately alignable in rotation of said gaging head bushing to dictate the right and left tolerance limits of at least one of the conditions, transverse twist of said head in opposite directions and nominal bend, relative to the transverse orientation of the other second end of said master member,
    (h) the second end of said master member being provided at the fixed reference point location with a similar second bushing-receiving hole having rotatably supported therein a generally similar second bushing head with its off-center gaging through hole being eccentrically arranged to have the axis of this gaging hole parallel to and laterally offset from the axis of the external cylindrical surface of this second bushing, and
    (i) the circumferential zone flanking one end of this second bushing hole carrying a diametrically opposite pair of index marks aligned with the longitudinal body reference line and said second gaging head bushing carrying a pointer mark extending radially in the direction of lateral offset of said axes which is alternately alignable with said pair of index marks in rotation of this gaging head bushing to dictate the maximum and minimum tolerance limits of the longitudinal distance between the centers of said bushing holes.

9. The air gage setting master of claim 8 in which the index mark-carrying circumferential zone of said second end of said master member carries an additional third index mark on a transverse radius of said second bushing-receiving hole which is at right angles to said longitudinal reference line for dictating a nominal distance between centers of the holes of said pair of gaging head bushings when said second gaging head bushing has its pointer mark aligned with this third index mark.

10. An air gage setting master for use in adjusting and checking the tolerance setting limits of computing indicator means of air gage apparatus having a pair of gaging air nozzle plugs fixedly located a certain distance apart for checking the relationship of the two bearing bores in opposite ends of any one of a plurality of production connecting rods or the like comprising, in combination,
    (a) an elongated rigid master body generally simulating such connecting rod and having at one end a first cylindrical crank arm bushing-receiving hole and at the other end of a second cylindrical pin bushing-receiving hole with the axes of these holes being precisely parallel and located a precise distance apart along the longitudinal axis of said body extending between and perpendicular to the axes of said holes, (b) a cylindrical crank arm bearing-simulating first bushing rotatably fitted into the first hole and having means to rotate it therein with said bushing being adapted temporarily to be held in any selected one of a plurality of positions of angular adjustment, (c) means defining a cylindrical eccentric gaging hole extending through said bushing for receiving one of said gaging plugs therein with the axis of this gaging hole being arranged parallel to and laterally offset from the axis of the external cylindrical surface of said bushing whereby the latter constitutes a first gaging head bushing of a first gaging head structure, (d) means surrounding and flanking one end of the first body hole provided with a pair of diametrically opposite index marks aligned with said longitudinal body axis, (e) said first gaging head bushing carrying a pointer mark extending radially in the direction of lateral offset of said head axes and alternately alignable with said pair of index marks in rotation of said first gaging head bushing to dictate the maximum and minimum tolerance limits of the longitudinal distance between the centers of the crank arm and pin bearings of a production connecting rod simulated by said master, (f) a cylindrical pin bearing-simulating second bushing rotatably fitted into the second body hole and having means to rotate it therein with said second bushing being adapted temporarily to be held in any selected one of a plurality of positions of angularly adjustment.

(g) means defining a cylindrical oblique gaging hole extending through said second bushing for receiving the other of said gaging plugs therein with its axis arranged at an acute small angle to the axis of the external cylindrical surface of said second bushing whereby the latter constitutes a second gaging head bushing of a second gaging head structure, and (h) means surrounding and flanking one end of the second body hole and provided with a pair of diametrically opposite index marks aligned with said longitudinal arm axis, (i) said second gaging head bushig carrying a pointer mark radially aligned with a radial plane in which said angularly related axes are disposed and alternately alignable with said pair of index marks associated with said second body hole to dictate the maximum tolerance limits of at least one of the conditions, longitudinal bend in opposite directions and nominal twist, of a production connecting rod simulated by said master, (j) said index-equipped means flanking the second body hole being also provided with another pair of diametrically opposite index marks aligned along a transverse radial line at right angles to sad longitudinal body axis with which said pointer mark of said second gaging head is alternately alignable in rotation of said second head to dictate the right and left tolerance limits of at least one of the conditions, transverse twist of the crank arm and pin bearings in opposite directions and nominal bend, of a production connecting rod simulated by said master.

11. The air gage setting master of claim 10 in which each gaging head bushing comprises a cylindrical sleeve having an annular flange at one end rotatably abutted inwardly against an annular zone of said body flanking one end of the bushing-receiving hole in which said sleeve is rotatably fitted, an annulus having an annular external lateral flange rotatably abutted against another annular zone of said body flanking the other end of the same bushing-receiving hole and a cylindrical projecting flange serving as a manually-engageable knob for rotating said gaging head bushing, and adjustable fastening means connecting said annulus to said sleeve permitting said sleeve and annulus flanges to be adjusted axially relative to each other for varying the frictional drag thereof against the annular zones.

12. The air gage setting master of claim 11 in which said fastening means comprises a plurality of screws extending between said sleeve and annulus, and in which there is provided a pair of linear bushings mounted through opposite ends of said arm with the bores of the linear bushings constituting said bushing-receiving holes.

References Cited
UNITED STATES PATENTS 2,933,815   4/1960   Czaplinski et al. _________ 73—1

OTHER REFERENCES

Sheffield Corporation Catalog No. I.P.C. 6–56, page 4 a publication of Sheffield Corp. Dayton 1, Ohio.

LOUIS R. PRINCE, *Primary Examiner.*

S. C. SWISHER, *Assistant Examiner.*